United States Patent [19]

Lowrance et al.

[11] Patent Number: 4,907,208
[45] Date of Patent: Mar. 6, 1990

[54] SONAR TRANSDUCER ASSEMBLY FOR FISHING BOATS

[75] Inventors: Darrell J. Lowrance; Roy Stiner, both of Tulsa; Phil Williams, Choteau, all of Okla.

[73] Assignee: Lowrance Electronics, Inc., Tulsa, Okla.

[21] Appl. No.: 279,044

[22] Filed: Dec. 2, 1988

[51] Int. Cl.$^4$ .............................................. H04R 17/00
[52] U.S. Cl. ................................ 367/154; 367/165; 367/173; 367/162; 367/106
[58] Field of Search ............... 367/165, 173, 188, 910, 367/155, 162, 176, 106

[56] References Cited

U.S. PATENT DOCUMENTS

| | | |
|---|---|---|
| 3,714,619 | 1/1973 | Morgan et al. |
| 3,729,162 | 4/1973 | Salvato . |
| 3,740,706 | 6/1973 | Joseph . |
| 3,752,431 | 8/1973 | McBride . |
| 4,152,690 | 6/1979 | Veatch . |
| 4,282,590 | 8/1981 | Wingate . |
| 4,285,485 | 8/1981 | Burke . |
| 4,731,763 | 3/1988 | Wagner ............................ 367/176 |
| 4,737,940 | 4/1988 | Arrington . |

Primary Examiner—Harold J. Tudor
Assistant Examiner—J. Woodrow Eldred
Attorney, Agent, or Firm—Larson and Taylor

[57] ABSTRACT

A sonar transducer assembly for a fishing boat provides electrical signals corresponding to an image of the area surrounding the boat on both sides thereof based on sound echoes received by the transducer assembly. The transducer assembly comprises a transducer housing mounted on the transom of the boat so that the bottom surface thereof is at substantially the level as the hull of the boat in the normal position of the transducer housing, and such that the transducer housing can move rearwardly and upwardly in response to hitting an object in the water. The housing is generally bullet-shaped and houses a plurality of individual transducers directed in different directions away from the hull of the boat so as to provide scanning of areas of the water beneath and on both sides of the boat.

20 Claims, 2 Drawing Sheets

SONAR TRANSDUCER ASSEMBLY FOR FISHING BOATS

FIELD OF THE INVENTION

The present invention relates to sonar systems for fishing boats or the like used to determine the location of fish or other targets in the water around the boat and, more particularly, to an improved transducer assembly for such systems.

BACKGROUND OF THE INVENTION

Sonar devices variously referred to as "fish finders" or "depth sounders" have been available for some time which are designed to tell a user what is below the boat. However, in general, it has only been through the use of expensive and complex "scanning" sonar that a fisherman has been able to tell where the fish are actually located below the boat and to thus answer the ages old question as to which side of the boat from which the fisherman should fish.

While devices and systems have been developed which "aim" sonar transducers in different directions so as to manually scan for fish, such devices are cumbersome and inconvenient for fisherman to use. It will be understood that transducers of the type being referred to here are devices which receive electrical energy from a transmitter or the like and convert this electrical energy into mechanical or acoustical energy that travels as a sound wave through the water, and which also convert back, to electrical energy, reflected sound waves received thereby whether the sound waves are reflected off of fish, the bottom or other targets. Thus, such transducers act in a manner similar to both a loudspeaker and a microphone.

In general, scanning transducers rely on mechanically rotating a transducer within a housing, or mechanically or electrically switching between a plurality of transducers and/or changing the phase relationships of the transducers, with the transducers being typically mounted in a hemispherical array. The information received from the transducers is displayed on a cathode ray tube or a similar display device and the information displayed is generally a sweeping pattern on the display which corresponds to the sweep of the transducer.

SUMMARY OF THE INVENTION

In accordance with the invention, a transducer assembly is provided for a simplified "scanning" sonar system which is able to tell a user whether fish (or other targets) are located to the left, right or directly under the boat on which the system is used.

As discussed in more detail below, the streamlined shape of the transducer housing of the invention provides a substantial reduction in drag as compared with prior art transducers and, moreover, the shape of the transducer housing enables the mounting thereof so that the longitudinal attitude of the transducer housing can vary substantially (up to about ±15° degrees) from the horizontal and the device still perform properly. Further, as is discussed below, the shape of the transducer enables mounting thereof in the same plane as the bottom of the boat hull, at least for boats having smooth hull bottoms. Further, the mounting arrangement of the transducer assembly is such that a "kick-up" action is provided wherein the housing is able to move to a position above the bottom of the boat out of harm's way after striking an object in the water, thereby protecting the device.

In accordance with a preferred embodiment of the invention, a sonar transducer assembly for a fishing boat, or the like, is provided which comprises a transducer housing; and mounting means for pivotably mounting the transducer housing to the transom of the boat so as to enable upward and rearward rotational movement thereof in response to the housing striking an object in the water; the housing having an elongate body portion and a rounded nose portion which, when the transducer assembly is mounted on the boat, faces upstream in the direction of travel of the boat, and the housing including a plurality of sonar transducers mounted in longitudinally spaced relationship therein and disposed so as to provide scanning of areas beneath the boat and on both sides of the boat.

Advantageously, the curvature of the nose portion of the housing includes a portion substantially in the shape of a portion of an ellipse or similar rounded curve. Further, the transducer housing is preferably substantially cylindrical in shape apart from said nose portion, so that the overall shape of the housing is generally that of a bullet.

The mounting means of the invention preferably comprises a boat mounting bracket adapted to be affixed to the transom of the boat, a transducer mounting bracket secured to the transducer housing, and pivot means for pivotably mounting the transducer mounting bracket on the boat mounting bracket so as to maintain the transducer housing in substantially the same location relative to the boat under normal operating conditions while enabling the aforementioned upward and rearward rotational movement of said transducer housing in response to the housing striking an object in the water. Advantageously, the pivot means comprises a pivot shaft and at least one lockwasher, and in a preferred embodiment, the pivot shaft is formed by a bolt, and a plurality of such lockwashers are mounted on the bolt. Advantageously, the boat mounting bracket includes first and second spaced rearwardly projecting side wall portions each including a row of holes therein, the rows of holes being aligned and the bolt extending through an aligned pair of the holes. In a preferred embodiment, the boat mounting bracket is generally U-shaped and includes a back portion adapted to be affixed to the transom of the boat, and the transducer mounting bracket is also generally U-shaped with the closed end thereof being embedded in or otherwise secured to the housing.

The transducer housing is preferably constructed of a plastic material and the transducers are advantageously embedded in a plastic material within the housing which holds the components of assembly in place. The transducers are preferably mounted within the housing such that, for each transducer, the distances through the plastic materials from an edge of the transducer and from a center portion of the transducer are different. As discussed hereinafter, this is a departure from prior art transducers wherein the distances in question are generally the same and the significance of this feature is discussed in more detail below.

In a preferred embodiment, the transducers each comprise a transducer crystal including at least one insulating layer thereon, and the transducers are embedded in an epoxy resin (the plastic material referred to above) which substantially fills the housing. The transducer crystals are cylindrical in shape and the sides of the crystals are preferably covered by a cork layer and a outer tape layer.

Other features and advantages of the invention will be set forth in, or apparent from, the detailed description of a preferred embodiment of the invention which follows.

DESCRIPTION OF A PREFERRED EMBODIMENT

Figures 1, 3:
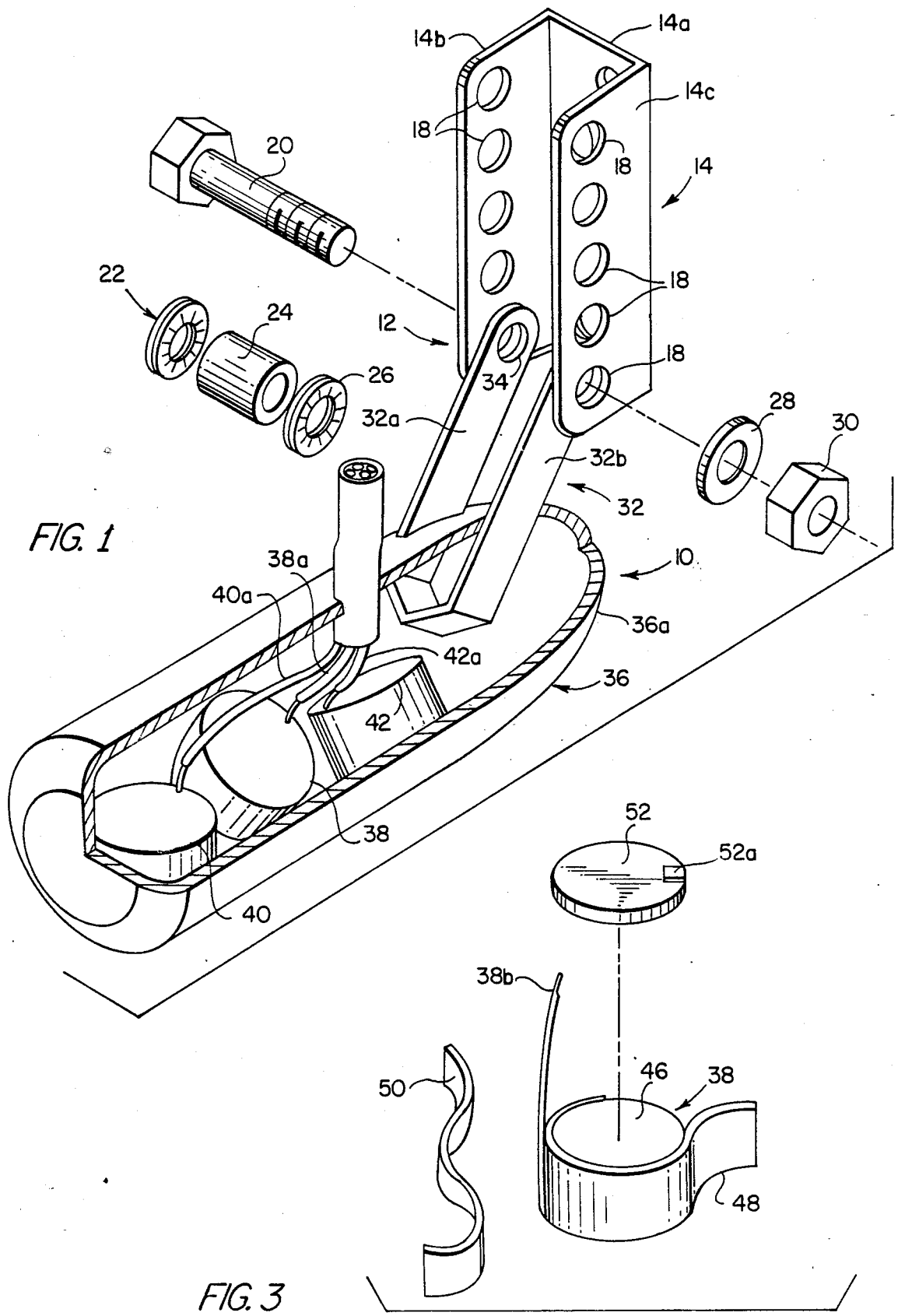
FIG. 1 is an exploded perspective view, partially broken away, of a sonar transducer assembly constructed in accordance with a preferred embodiment of the invention.
FIG. 3 is an exploded view of one of the transducers of FIGS. 1 and 2.
Figure 2:
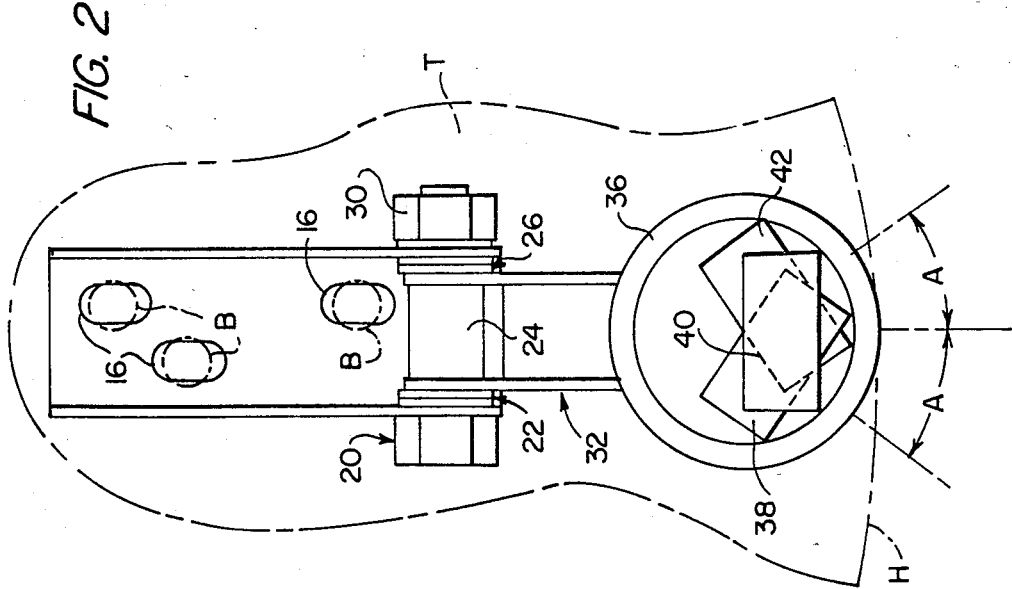
FIG. 2 is an end elevational view, partially in section, and with parts removed for purposes of clarity, of the transducer assembly of FIG. 1, with a portion of a boat on which the assembly is mounted being shown in dashed lines.

Referring to FIGS. 1 and 2, there is shown a preferred embodiment of the sonar transducer assembly of the invention. The transducer assembly, which is generally denoted 10, includes a mounting arrangement 12 comprising a U-shaped bracket 14 whose back portion 14a is adapted to be secured, through the provision of a series of openings 16 therein, to a boat transom, a portion of which, denoted T is indicated in dashed lines in FIG. 2. As is also illustrated in FIG. 2, bolts, denoted B, can be used to secure bracket 14 to the transom T.

The side walls or lateral portions 14b, 14c of bracket 14 each include vertical rows of holes or openings 18 therein, with pairs of holes 18 of the two side portions 14b, 14c being in alignment so as to receive the shaft of a threaded bolt 20 therethrough. Mounted on the shaft of bolt 20 between side portions 14b, 14c are, in sequence from the left as viewed in FIGS. 1 and 2, a first pair of internal star lockwashers 22, a spacer 24 and a second pair of internal star lockwashers 26, and outside thereof (i.e., externally of bracket portion 14c), a helical lockwasher 28 and a nut 30. This assembly supports the arms 32a, 32b of a generally U-shaped transducer body bracket 32, with the bolt 20 extending through holes 34 (one of which can be seen in FIG. 1) at the ends of arms 32a, 32b. The other end of body bracket 32 extends through the walls of and is embedded in or otherwise secured to a transducer body member or housing 36.

As illustrated in FIG. 1, body member 36 is generally bullet shaped and includes a cylindrical body and a generally elliptically shaped nose, denoted 36a, which, as mentioned above, enables the transducer body to move through the water with minimum drag. Considering this point in more detail, it is noted that scanning transducers have historically been large and basically unusable at high speeds of travel through the water. In this regard, generally speaking, the majority of fisherman use boats under 25 feet in length which cruise at speeds of 30 to 60 miles per hour, and the frontal area of prior art transducers cause significant drag at these speeds, thereby affecting boat speed and maneuverability. The bullet shape of the transducer body 36 and, in particular, the rounded or elliptically shaped nose 36a, provides substantial improvement with respect to drag. In a specific embodiment, the frontal area of the transducer body 36 is 2.4 inches and tests have shown that the top speed performance of an 18 foot fishing boat with a 175 hp engine is reduced only 2 mph (from 69 mph to 67 mph) with a transducer mounted to the boat transom so as to be completely below the bottom of the hull, i.e., fully submerged. The shape of the transducer body 36 allows for a clean laminar flow of water thereover with a minimum of drag.

In the illustrated embodiment, transducer body 36 carries three transducers 38, 40 and 42 along the length thereof. As perhaps can best be seen in FIG. 2, the transducer 38 is directed to the left, transducer 40 is directed directly down and transducer 42 is directed to the right, with an equal angle A between the transducers. In a specific exemplary embodiment, this angle A is 35°.

Transducers 38, 40 and 42 are individually connected by corresponding wire connections 38a, 40a and 42a enclosed within a transducer cable 44 back to the conventional system electronics on the boat. It will be understood that any number of transducers employed limited only by the practical longitudinal length of the transducer body 36 as a whole and that these transducers can be arranged at various angles to provide maximum coverage.

Figure 4:
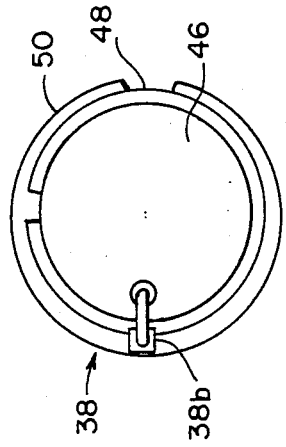
FIG. 4 is a top plan view of the transducer element of FIG. 3.
Figure 5:
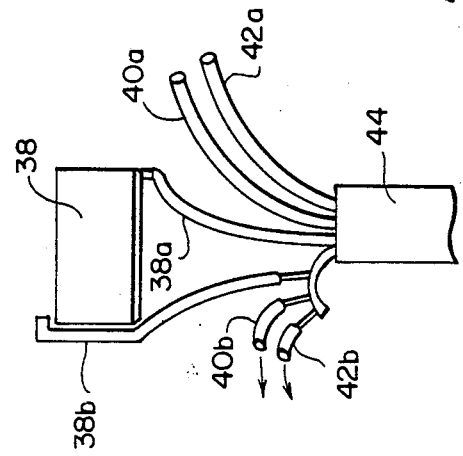
FIG. 5 is a side elevational view of one of the transducers of FIGS. 1 and 2, showing the electrical connections thereto as well as the connectors for the other transducers.

The individual transducers 38, 40, and 42 are preferably of the construction shown in FIGS. 3 to 5, wherein considering transducer 38 as typical, a transducer crystal 46 is first wrapped in a cork layer 48 and then enclosed by tape 50. A top member 52 of closed cell foam including a notch 52a for connection wire 38a covers the top of crystal 46. As illustrated in FIG. 5, two wire connections are provided for each crystal, the ground connections being indicated in FIG. 5, at 38b, 40b, and 42b. In providing these connections, the top and bottom of crystal 46 are silver plated, and the "hot" wire 38a is soldered to the top thereof and the ground wire 38b is soldered to the bottom. After all transducer components are mounted in place within transducer body or housing 36, body 36 is filled with epoxy.

The mounting arrangement for transducer body 36, including the shape of body bracket 32, is such that bracket 32 acts as a "kick-up" bracket when the transducer body hits an object in the water. When hit on nose 36a, the transducer body 36 will rotate around the bolt 20 used to connect transducer body bracket 32 to boat transom bracket 14, to a position above the bottom of the boat. The lockwashers 22, 26 and 28 act as a clutch that maintains the transducer stationary at pressure levels caused by the flow of water around the transducer body 36, but give way or release their grip when hit by a high shock force. This minimizes the risk of tearing the transducer 36 off the transom of the boat when the transducer 36 hits an object in the water.

The shape of transducer 36 permits mounting thereof so that the longitudinal attitude thereof can be up to ±15° from the horizontal and still perform properly. As discussed above, attitude is critical with prior art transducers and, in particular, if prior art transducers are not set correctly (especially with respect to the negative attitude), cavitation, or air bubbles over the face of the transducer, will be created at high speed, thereby causing noise in the sonar signal and thus reducing or eliminating the ability thereof to "see" the true sonar signals through the noise.

The shape of transducer 36 also permits mounting thereof so that the bottom of the transducer 36 is in the sample plane as the bottom of the boat hull as indicated in FIG. 2 wherein the boat hull is denoted H. The curved shape of transducer 36 causes water flowing off the transom to flow therearound, so that eve the side facing transducers 38 and 42 are not disturbed by noise created by the bubbles on the water surface. Although this mounting method works well with boats with smooth hull bottoms, the method generally should not be used with aluminum boats having large numbers of rivets on the bottom of the hull.

It is noted that some of the attributes discussed above are enhanced by the provision of an arrangement wherein the transducers 28, 40 and 42 "shoot", i.e., transmit and receive mechanical or acoustical energy, through a varying thickness of plastic, thereby permitting the use of transducer elements of a cylindrical shape. Generally speaking, the thinking in the prior art has been that optimum performance is achieved by shooting through a constant material thickness of $\frac{1}{4}$ wavelength of the operating frequency based on the speed of sound through the material (e.g., 0.090 inches for a typical plastic used for this purpose). However, the device of the invention can operate effectively when shooting through varying thicknesses, for example, thicknesses of 0.35 wavelength at the edges and 0.83 wavelength at the middle for the plastic referred to above. The effect produced is a diffusing of the sonar signal, i.e., spreading of the area covered thereby, which, it will be appreciated, is actually an advantage in applications such as fish finding wherein wide coverage is desired.

Although the present invention has been described relative to an exemplary embodiment thereof, it will be understood by those skilled in the art that variations and modifications can be effected in this exemplary embodiment without departing from the scope and spirit of the invention.

What is claimed is:

1. A sonar transducer assembly for a boat having a transom, said transducer assembly comprising:
   a transducer housing; and
   mounting means for pivotably mounting the transducer housing to the transom of the boat so as to enable upward and rearward rotational movement thereof in response to the housing striking an object in the water;
   said housing having an elongate body portion and a rounded nose portion which, when the transducer assembly is mounted on the boat, faces in an upstream direction of travel of the boat and said housing including a plurality of sonar transducers mounted serially in said elongate body portion along the longitudinal axis of the body portion and disposed so as to provide scanning of areas beneath the boat and on both sides of the boat.

2. A sonar transducer assembly as claimed in claim 1 wherein the curvature of the nose portion of said housing includes a portion substantially in the shape of a portion of an ellipse.

3. A sonar transducer assembly as claimed in claim 1 wherein said transducer housing is substantially cylindrical in shape apart from said nose portion.

4. A sonar transducer assembly as claimed in claim 1 wherein said mounting means comprises a boat mounting bracket adapted to be affixed to the transom of the boat, a transducer mounting bracket secured to said transducer housing, and pivot means for pivotably mounting the transducer mounting bracket on the boat mounting bracket so as to maintain said transducer housing in substantially the same location relative to the boat under normal operating conditions while enabling said upward and rearward rotational movement of said transducer housing in response to the housing striking an object in the water.

5. A sonar transducer assembly as claimed in claim 4 wherein said pivot means comprises a pivot shaft and at least one lockwasher.

6. A sonar transducer assembly as claimed in claim 5 wherein said pivot shaft is formed by a bolt and a plurality of said lockwashers are mounted on said bolt.

7. A sonar transducer assembly as claimed in claim 6 wherein said boat mounting bracket includes first and second spaced rearwardly projecting side wall portions each including a row of holes therein, said rows of holes being aligned and said bolt extending through an aligned pair of said holes.

8. A sonar transducer assembly as claimed in claim 1 wherein a transducer housing is constructed of a plastic material and wherein said transducers are embedded in a plastic material within said housing.

9. A sonar transducer assembly as claimed in claim 1 wherein said transducers each comprise a transducer crystal including at least one insulating layer thereon and said transducers are embedded in an epoxy resin which substantially fills said housing.

10. A sonar transducer assembly as claimed in claim 9 wherein said transducer crystals are cylindrical in shape and the sides of said crystals are covered by a cork layer and a outer tape layer.

11. A sonar transducer assembly as claimed in claim 4 wherein said boat mounting bracket is generally U-shaped and includes a back portion adapted to be affixed to the transom of the boat.

12. A sonar transducer assembly as claimed in claim 3 wherein said transducer mounting bracket is generally U-shaped and wherein the closed end of the U-shaped bracket is embedded in said housing.

13. In combination, a boat including a transom and hull, and a sonar transducer assembly for providing electrical signals corresponding to an image of the area surrounding the boat on both sides thereof based on sound echoes received by said transducer assembly, said transducer assembly comprising a transducer housing; and means for mounting said transducer housing on the transom so that the bottom surface thereof is at substantially the level as the hull of the boat in the normal position of said transducer housing, and such that the transducer housing can move rearwardly and upwardly in response to hitting an object in the water, said housing including a tapered nose portion and an elongate body portion and including a plurality of transducers arranged serially therein along the longitudinal axis of the housing and directed in different directions away from the hull of the boat to provide scanning of areas of water beneath and on both sides of the boat.

14. The combination as claimed in claim 13 wherein said mounting means comprises a boat mounting bracket adapted to be affixed to the transom of the boat, a transducer mounting bracket secured to said transducer housing, and pivot means for pivotably mounting the transducer mounting bracket on the boat mounting bracket so as to maintain said transducer housing in substantially the same location relative to the boat under normal operating conditions while enabling upward and rearward movement of said transducer housing in response to the housing striking an object in the water.

15. The combination as claimed in claim 14 wherein said pivot means comprises a pivot shaft and at least one lockwasher.

16. The combination as claimed in claim 15 wherein said pivot shaft is formed by a bolt and a plurality of said lockwashers are mounted on said bolt, said boat mounting bracket including first and second spaced rearwardly projecting side wall portions each including a row of holes therein, said rows of holes being aligned and said bolt extending through an aligned pair of said holes.

17. A sonar transducer assembly for a boat having a transom, said transducer assembly comprising:
a transducer housing fabricated of plastic; and
mounting means for pivotably mounting the transducer housing to the transom of the boat so as to enable upward and rearward rotational movement thereof in response to the housing striking an object in the water;
said housing having cylindrical body and a rounded nose portion which, when the transducer assembly is mounted on the boat, faces in an upstream direction of travel of the boat, said housing including at least three sonar transducers serially mounted therein in longitudinally spaced relationship along the longitudinal axis of the housing, said sonar transducers being disposed so as to provide scanning of areas beneath the boat and on the left and right sides of the boat, respectively.

18. A sonar transducer assembly as claimed in claim 17 wherein said mounting means comprises a boat mounting bracket affixed to the transom of the boat, a transducer mounting bracket secured to said transducer housing, and pivot means for pivotably mounting the transducer mounting bracket on the boat mounting bracket so as to maintain said transducer housing in substantially the same location relative to the boat under normal operating conditions while enabling said upward and rearward rotational movement of said transducer housing in response to the housing striking an object in the water.

19. A sonar transducer assembly as claimed in claim 18 wherein said pivot means comprises a pivot shaft and at least one lockwasher.

20. A sonar transducer assembly as claimed in claim 1 wherein said plurality of transducers comprises three transducers, and wherein said transducers are substantially cylindrical in shape and are directed beneath the boat, to one side of the boat and to the other side of the boat, respectively.

* * * * *